United States Patent
Kharche et al.

(10) Patent No.: US 12,472,851 B2
(45) Date of Patent: Nov. 18, 2025

(54) VEHICLE SEAT LONGITUDINAL ADJUSTMENT ASSEMBLY

(71) Applicant: Brose Fahrzeugteile SE & Co. Kommanditgesellschaft, Coburg, Coburg (DE)

(72) Inventors: Dhiraj Kharche, Auburn Hills, MI (US); Leo Ioppolo, Washington, MI (US); Sean Sabo, West Bloomfield, MI (US)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 182 days.

(21) Appl. No.: 18/584,306

(22) Filed: Feb. 22, 2024

(65) Prior Publication Data
US 2025/0269768 A1    Aug. 28, 2025

(51) Int. Cl.
*B60N 2/07*    (2006.01)
*B60N 2/08*    (2006.01)

(52) U.S. Cl.
CPC ............ *B60N 2/0722* (2013.01); *B60N 2/08* (2013.01)

(58) Field of Classification Search
CPC ................................ B60N 2/0722; B60N 2/08
See application file for complete search history.

(56) References Cited

U.S. PATENT DOCUMENTS

| | | | | |
|---|---|---|---|---|
| 2015/0083882 | A1* | 3/2015 | Stutika | B60N 2/0722 248/429 |
| 2021/0323448 | A1* | 10/2021 | Inoue | B60N 2/0722 |
| 2023/0075793 | A1* | 3/2023 | Inasako | B60N 2/0722 |

FOREIGN PATENT DOCUMENTS

DE           20313952 U1    1/2005

* cited by examiner

*Primary Examiner* — Rodney A Bonnette
(74) *Attorney, Agent, or Firm* — Dickinson Wright PLLC

(57) ABSTRACT

A method of assembling a release assembly for use in a vehicle seat. The method including attaching a spring to a coupling, the spring including a first end and a second end, wherein the coupling defines a first receptacle and a channel, and inserting the first end of the spring into the channel defined by the coupling. Inserting a portion of the coupling into a second receptacle defined by an actuation lever, the actuation lever fixed to a transverse member, and configured to pivot about an axis defined transverse member to engage a locking lever of the locking device to unlock the translatable rail from the fixed rail. The method further including rotating the coupling in a first rotational direction, relative to the second receptacle, to a first rotational position so that the second end of the spring engages the actuation lever.

20 Claims, 12 Drawing Sheets

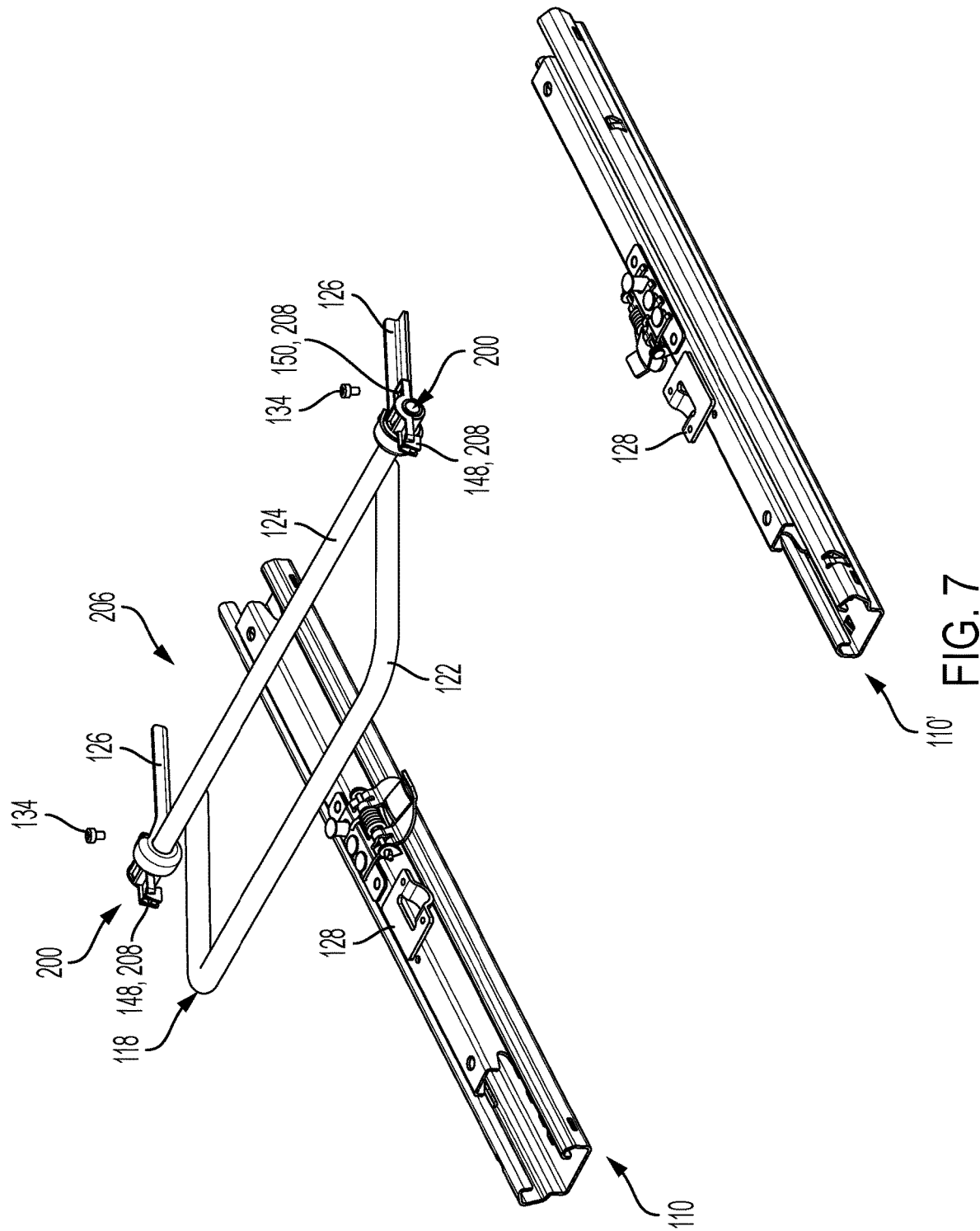

VEHICLE SEAT LONGITUDINAL ADJUSTMENT ASSEMBLY

TECHNICAL FIELD

The present disclosure relates to vehicle seats, including vehicle seats provided with a manual longitudinal adjustment assembly and a release assembly for the same.

BACKGROUND

A vehicle seat with a release assembly is described in German Utility Patent DE 203 13 952 U1.

SUMMARY

According to one embodiment, a vehicle seat is provided. The vehicle seat may include a first rail assembly, a first locking device, and a release assembly. The release assembly may include a handle, a transverse member, a first release lever, a first coupling, and a first spring. The first rail assembly may include a first fixed rail and a first translatable rail, the first fixed rail may be configured to be fixed to the vehicle floor and the first translatable rail may be configured to translate along the first fixed rail. The first locking device may be coupled to the first rail assembly and configured to selectively change between a locked state, in which the first locking device locks the first translatable rail to the first fixed rail, and an unlocked state in which the first locking device unlocks the first translatable rail from the first fixed rail. The transverse member of the release assembly may be fixed to the handle and the first actuation lever. The first coupling may include a flange and a barrel extending from the flange, the barrel may form a first receptacle and a channel. The first actuation lever may include a distal end portion, a proximal end portion, and a medial portion extending there between. The first actuation lever may further include a second receptacle extending from the proximal end portion. The distal end portion may be configured to engage a locking lever of the locking device to change the state of the locking device from the locked state to the unlocked state. The proximal portion may form a second receptacle that may be configured to receive at least a portion of the barrel. The first spring may include a fixed leg and a free leg. The fixed leg may be disposed in the channel defined by the barrel and the free leg of the first spring may be configured to bias the distal end portion of the release lever against the locking lever of the locking device.

According to another embodiment, a release assembly for use in a vehicle seat is provided. The vehicle seat may include a pair of rail assemblies and each rail assembly of the pair of rail assemblies may include a fixed rail, a translatable rail, and a locking device. The locking device may be configured to selectively lock the translatable rail to the fixed rail and unlock the translatable rail from the fixed rail to permit translation of the translatable rail along the fixed rail. The release assembly may include a coupling, a spring, and an actuation assembly. The actuation assembly may include an actuation lever that may define a second receptacle, a transverse member, and a handle. The actuation lever and the handle may each be coupled to the transverse member. The coupling may include a barrel and a flange that may extend from the barrel. A portion of the coupling may define a channel and the barrel may define the first receptacle. The spring may include a first end and a second end. The channel defined by the coupling may be configured to receive the first end of the spring. At least a portion of the barrel may be configured to nest within the second receptacle defined by the actuation lever so that the second end of the spring lies against a portion of the actuation lever. In a pre-installed state, in which the coupling is not fixed relative to the translatable rail, the coupling may be in a first position with respect to the second receptacle. In an installed state, in which the coupling is fixed relative to the translatable rail, the coupling is in a second position with respect to the second receptacle. As an example, the second position may be different than the first position.

According to yet another embodiment, a method of assembling a release assembly for use in a vehicle seat is provided. The vehicle seat may include a pair of rail assemblies and each rail assembly of the pair of rail assemblies may include a fixed rail, a translatable rail, and a locking device. The locking device may be configured to selectively lock the translatable rail to the fixed rail and unlock the translatable rail from the fixed rail to permit translation of the translatable rail along the fixed rail. The method may include: attaching a spring to a coupling, the spring may include a first end and a second end, and the coupling may define a first receptacle and a channel. The attaching step may include inserting the first end of the spring into the channel defined by the coupling. The method may also include inserting a portion of the coupling into a second receptacle defined by an actuation lever. The actuation lever may be fixed to a transverse member and may be configured to pivot about an axis defined by the transverse member to engage a locking lever of the locking device to unlock the translatable rail from the fixed rail. The method may further include rotating the coupling in a first rotational direction relative to the second receptacle to a first rotational position so that the second end of the spring engages the actuation lever.

BRIEF DESCRIPTION OF THE DRAWINGS

FIG. 7 illustrates an exploded perspective view of another release assembly and a pair of rail assemblies configured for use in a vehicle seat.

DETAILED DESCRIPTION

Figure 1:
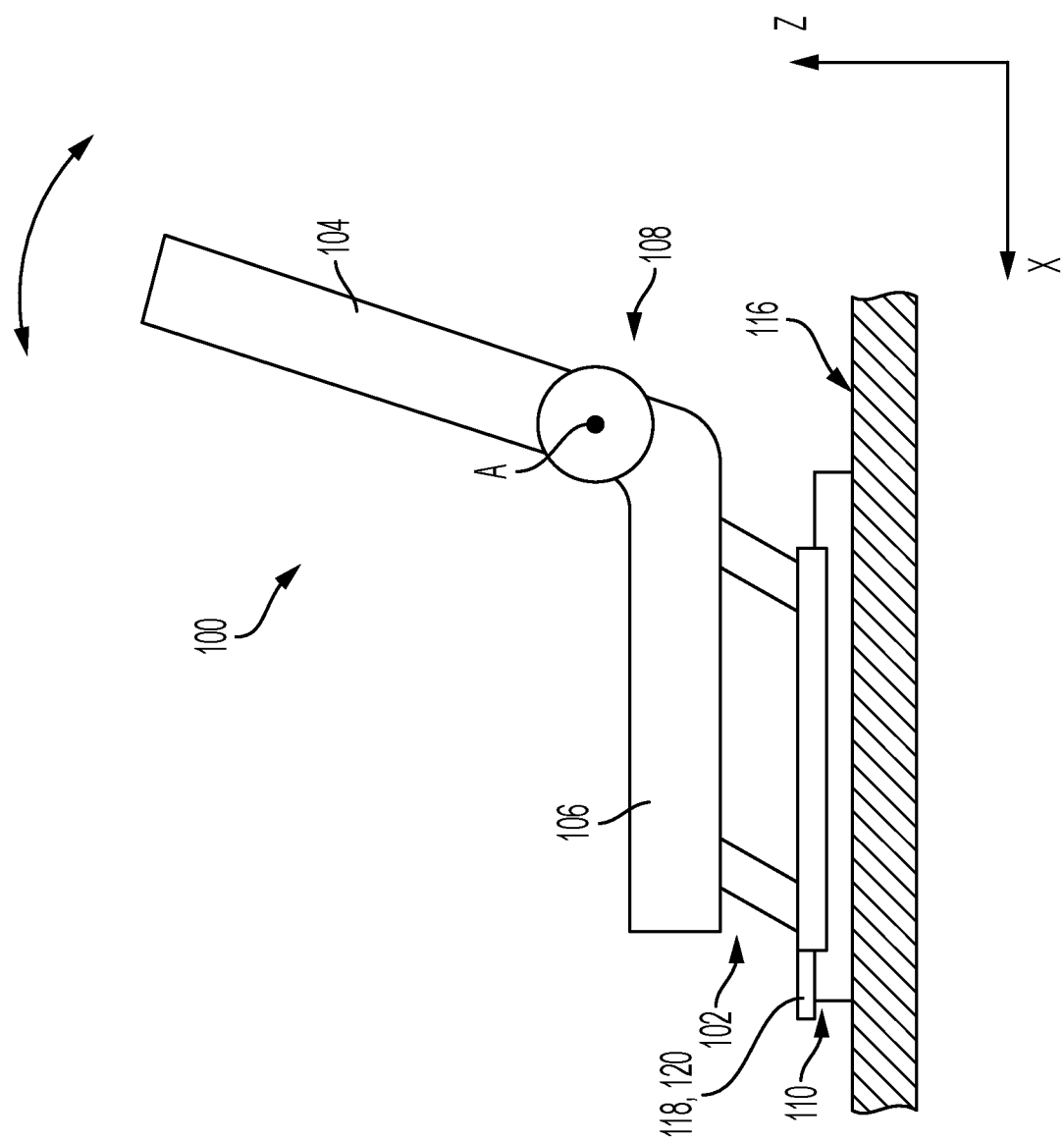
FIG. 1 illustrates a schematic diagram of an exemplary vehicle seat.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Vehicle seats, in particular those vehicle seats that are manually adjustable to change the longitudinal position (e.g., in the fore-aft direction) of the seat include a release assembly that may be actuated to unlock the translatable rails from the fixed rails so that the user may slide the vehicle seat in the forward and rearward directions. Generally, the manufacturer of the vehicle seat may assemble the rail assemblies as separate components and marry the rail assemblies to one another by attaching the release assembly and one or more other assemblies, such as an upper frame assembly or cushion portion to form a seat sub-assembly or the complete seat. The manufacturer will then supply the seat sub-assembly or complete seat to an original equipment manufacturer (OEM) or a higher tier manufacturer. The OEM will then incorporate the complete seat into the desired motor vehicle.

Under certain circumstances, the OEM or higher tier manufacturer may desire to assemble portions of the seat in their own facility prior to incorporating the seat into vehicles. As an example, the OEM may require the seat manufacturer to ship the rail assemblies and the release assembly as separate components and the OEM may then assemble the release assembly to the rail assemblies prior to incorporating the vehicle seat into the vehicle. Typically, assembling the release assembly to the rail assemblies requires placing the rail assemblies on floating fixtures and positioning the release assembly between each rail assembly and sliding the rail assemblies towards the release assembly to fix the release assembly to the each of the rail assemblies. In short, this requires placing each rail assembly, placing the release assembly, positioning each of the rail assemblies onto the release assembly, and fixing the release assembly to each of the rail assemblies. This process has been found to be relatively complicated and time consuming.

The disclosure provided herein attempts to address the above-mentioned shortcomings.

FIG. 1 illustrates a schematic illustration of an exemplary vehicle seat 100 provided with a cushion portion 102 and a backrest 104. A fitting or recliner 108 may connect the backrest 104 to one or more portions of the cushion portion 102 such as a seat cushion 106. The recliner 108 may be configured to rotate about an axis A to adjust the inclination of the backrest 104 as represented by the bi-directional arrow disposed above the backrest 104. The cushion portion 102 may include one or more (e.g., two) rail assemblies 110 that may be fixed to a vehicle floor 116.

The rail assemblies 110 may each include a fixed rail 112 and a translatable rail 114 that may be configured to translate along the fixed rail 112 to adjust the cushion portion 102 and backrest 104 in a longitudinal direction as represented by the x-axis. The cushion portion 102 may include an actuation assembly 118 and release assembly 120 and at least one of the rail assemblies 110 may include a locking device 132 (FIG. 3) that may be actuated in response to a force applied to the release assembly 120 in one or more directions (e.g., vertical direction, as represented by the z-axis).

Figure 2:
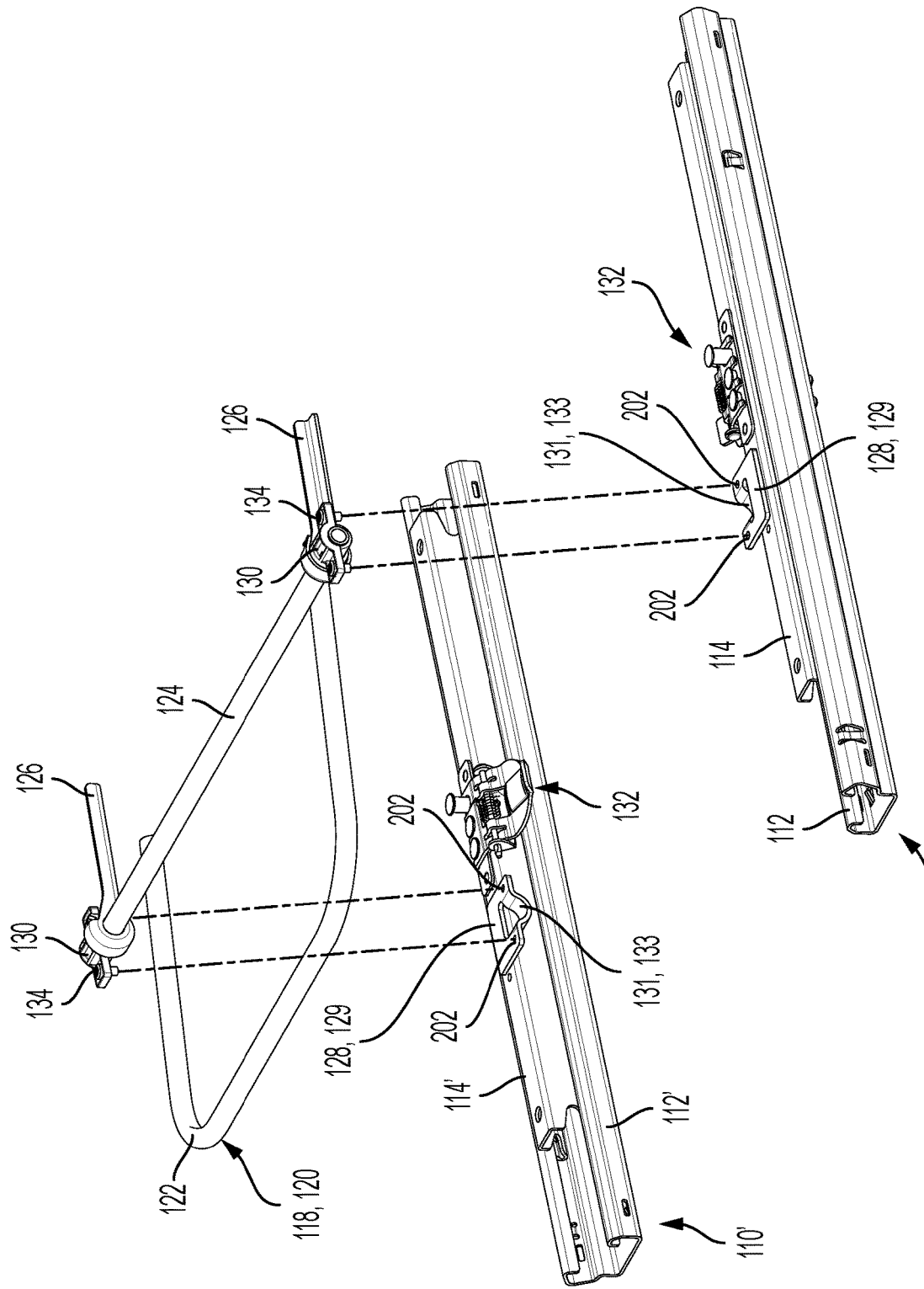
FIG. 2 illustrates an exploded view of a release assembly and a pair of rail assemblies configured for use in a vehicle seat.
Figure 3:
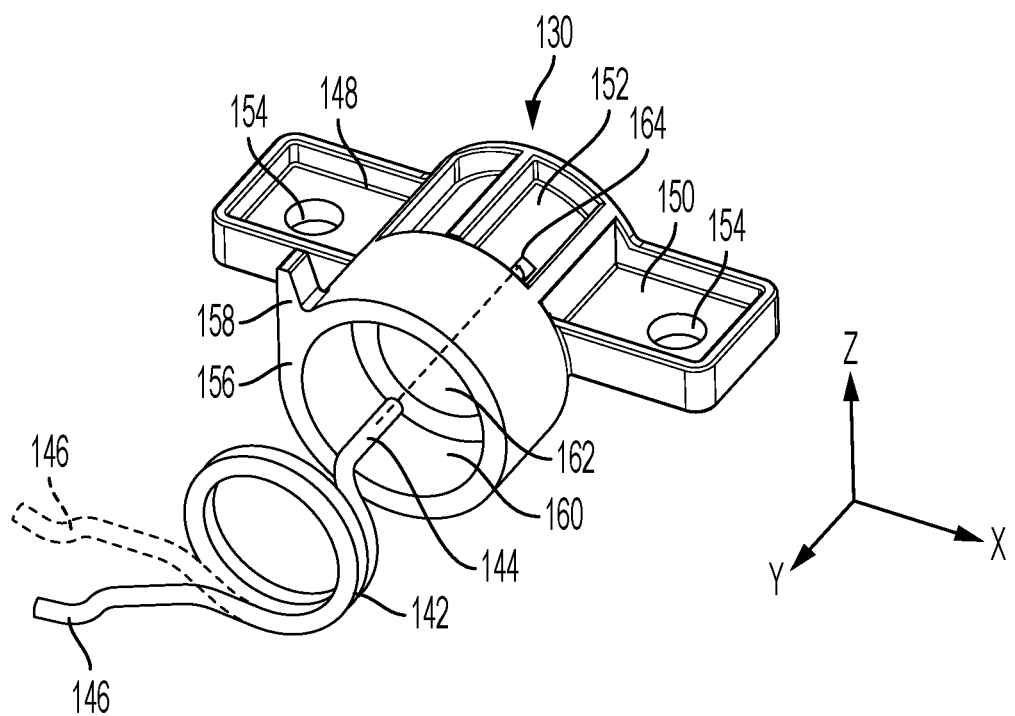
FIG. 3 illustrates an exploded view of a portion of the release assembly.

FIG. 2 illustrates a perspective view of the release assembly 120, including the actuation assembly 118, that is disposed above a pair of rail assemblies 110, 110'. FIG. 3 illustrates a perspective-exploded view of a portion of the release assembly 120. For purposes of clarity, the rail assemblies 110 are depicted without brackets (except for mounting bracket 128) generally fixed to the fixed rails 112 and translatable rails 114. And reference numeral 110 generally refers to both rail assemblies as well as the left-hand rail assembly 110. Reference numeral 110' refers to the right-hand rail assembly 110'. As will be described in greater detail below, the actuation assembly 118 may be configured as a modular unit or sub-assembly that may be shipped to a higher tier manufacturer or OEM so that the higher tier manufacturer or OEM may assemble the actuation assembly 118 to the rail assemblies 110 in a relatively easy and cost-efficient manner.

The actuation assembly 118 may include a handle 122, a transverse member 124, and one or more release levers or actuation levers 126. The transverse member 124 may be formed by a metal tube or other cylindrical shaped member that may be fixed (e.g., welded) to the handle 122 and each of the actuation levers 126. Note, one or more of the handle 122, release levers 126, and transverse member 124 may be integrally formed or connected to one another as opposed to being separate components as depicted in FIG. 2. As a force is applied to the handle 122, the transverse member 124 may rotate about a rotational axis RA to pivot the actuation lever 126 to unlock the translatable rails 114, 114' from the fixed rails 112, 112'.

One or more of the rail assemblies 110 may include a mounting bracket 128 that may be configured to receive and fix portions of the release assembly 120 to the rail assemblies 110. In one or more embodiments, the mounting bracket 128 may be fixed to a portion of each of the translatable rails 114, 114' such as to a top wall or surface of each translatable rail 114, 114'. In one or more embodiments, the mounting bracket 128 may include a main body 129 and an edge portion 131 that may extend from the main body 129 so that the edge portion is disposed between the left-hand rail assembly 110 and the right-hand rail assembly 110'.

The mounting bracket 128 may include one or more features that are configured to retain or fix the housing or coupling 130 of the release assembly 120 to each of the rail assemblies 110, 110'. As an example, the edge portion 131 may define or form a recess 133 that may have a curved shape so that when the release assembly 120 is fixed to each of the rail assemblies 110, 110', a bottom portion of the barrel 152 (FIG. 3) of the housing or coupling 130 nests within the recess 133. Because of the recess 130, the release assembly 120 is positioned so that distal end portions 170 of the actuation levers 126 engage portions of the locking device 132.

Each of the rail assemblies 110, 110' may include a locking device 132 that may be disposed rearward of the mounting bracket 128. An exemplary locking device is disclosed in German Utility Patent DE 203 13 952 U1 which is hereby incorporated by reference.

Figure 12:
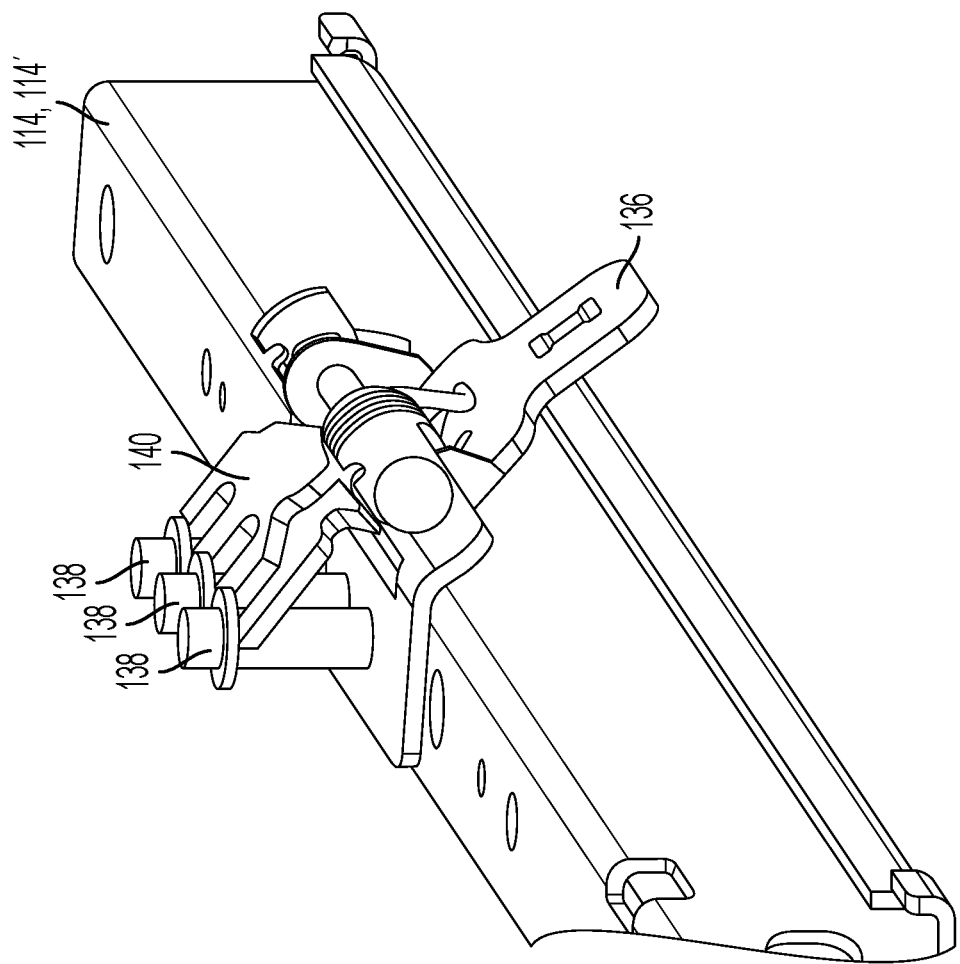
FIG. 12 illustrates a perspective view of an exemplary rail assembly in an unlocked state.

Referring now to FIG. 12, the locking device 132 may include one or more (e.g., three) pins 138 that may extend through the top wall of the translatable rail 114 and engage holes or slots formed in the fixed rail when the locking device 132 is in the locked state. The locking device 132 may include or more levers such as a locking lever 136 and a pin lever 136 that may cooperate with one another to move (e.g., raise) the pins 138 so that the pins 138 disengage from the fixed rail 112, 112' and change the state of the locking device 132 from the locked state to the unlocked state to permit the translatable rails 114, 114' to translate along the fixed rails 112, 112'. When the release assembly 120 is in the installed position, the actuation lever 126 may engage or lie along a portion of the locking lever 136.

Referring back to FIG. 2 and FIG. 3, the release assembly 120 may include the actuation assembly 118, one or more spring housings or couplings 130, and one or more springs 142. The coupling 130 may include a barrel 152, one or more flanges 148, 150, an annular ring 156, and a protrusion 158. Note in one or more embodiments, the coupling is 130 may be an injection molded component formed of one or more polymeric materials including thermoplastics such as Polypropylene, such as a glass-filled Polyproylene (Celstran PP-GF30-0453 P10/0), or Polyamide 66 (PA66) or another suitable material, as required and one or more of the components that form the coupling may be integrally formed with one another. As an example, the barrel 152 may include the annular ring 156 and the annular ring 156 may include the protrusion 158. As will be described in greater detail below, the coupling 130 may be configured to form a pre-assembly or sub-assembly that may be supplied to another manufacturer or OEM and assembled to the rail assemblies 110 in a relatively efficient manner.

In one or more embodiments, the barrel 152 may have an elongated body, that has a length that extends in the longitudinal direction (e.g., the y-axis) that is greater than the width (e.g., extending in the x-direction) of the barrel 152. The one or more flanges may include the first flange 148 and the second flange 150 that may each extend in the longitudinal direction (e.g., as represented by the x-axis). The first flange 148, the second flange 150, or both may each define one or more attachment apertures 154 that may be configured to receive one or more fasteners 134 that may thread into or engage one or more apertures 202 defined by the mounting bracket 128.

The annular ring 156 may extend from the 152 in the axial direction (e.g., y-direction) and the outer diameter, inner diameter, or both of the annular ring 156 may be greater than the inner diameter, outer diameter, or both the inner and outer of the barrel 152. As an example, the inner periphery of the annular ring 156 may form or define a spring receptacle 160. An inner periphery of the barrel 152 may form transverse member receptacle 162 that may be configured to receive an end portion 166 (FIG. 4) of the transverse member 124.

The release assembly 120 may include one or more springs 142 that may be configured to set the rotational position of the coupling 130 relative to the actuation lever (e.g., in a pre-installed state or prior to assembling the release assembly 120 to the pair of rails 110) and apply a biasing force to the actuation lever 126 (e.g., in an installed state or when the release assembly 120 is assembled to the pair of rails 110). The spring 142 may be a torsion spring provided with a first end or fixed end 144, a second end or free end 146, and one or more coils that may extend between the fixed end 144 and the free end 146. The free end 146 of the spring 142 is shown in a free state, in which the free end 146 does not engage the actuation lever 126, and an engaged state or tensioned state (as represented by hidden lines in FIG. 3), in which the free end 146 engages the actuation lever 126. As an example, the barrel 152 may define an aperture or channel 164 that may receive the fixed end 144 of the spring and the spring receptacle 160 may be configured or sized to receive the one or more coils extending between the free end 146 and the fixed end 144.

Figure 4:
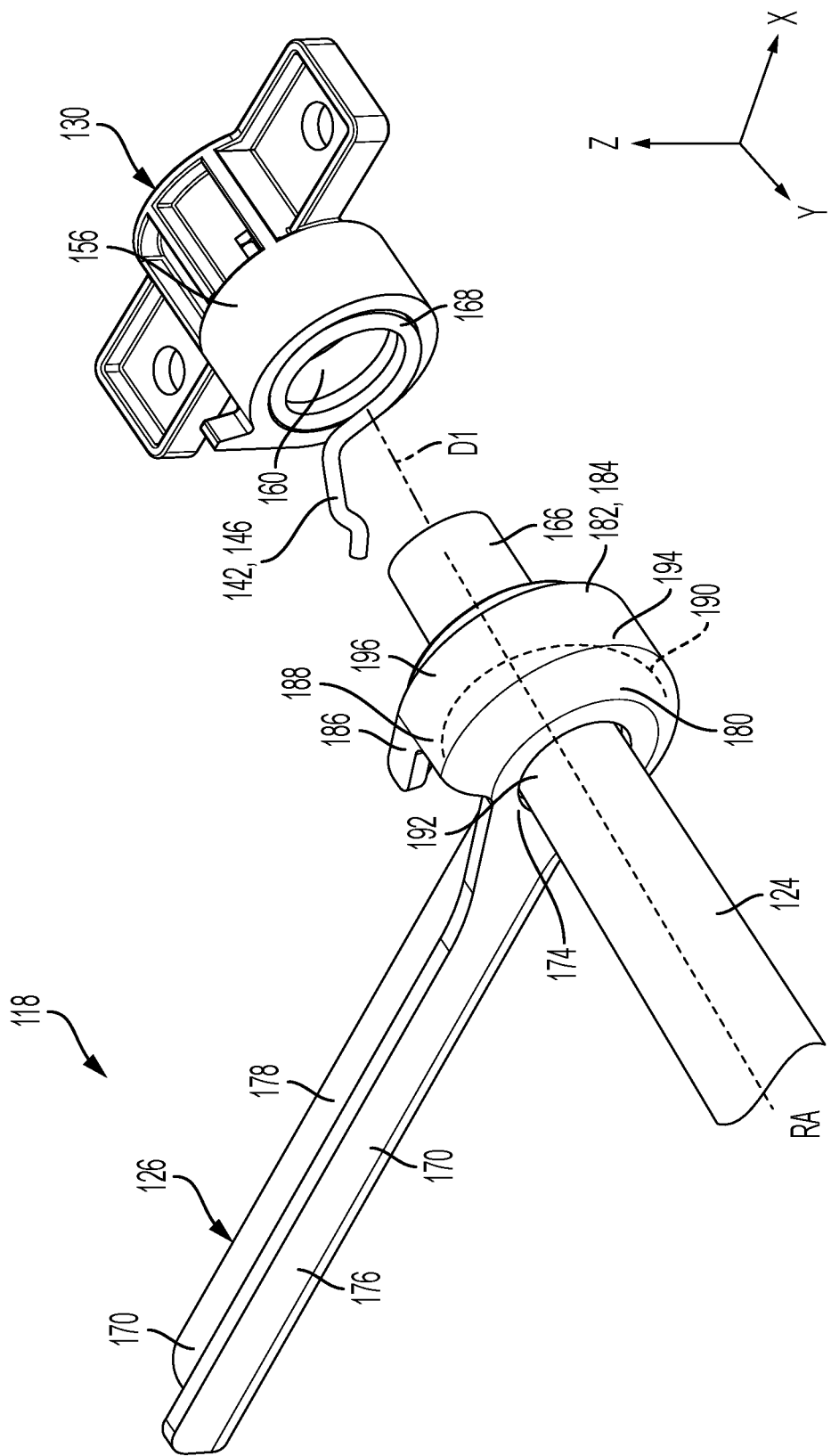
FIG. 4 illustrates an exploded view of the portion of the release assembly illustrated in FIG. 3 and a portion of an actuation assembly.

FIG. 4 illustrates a perspective view of a portion of the actuation assembly 118, including the actuation lever 126 and the transverse member 124, being assembled to the coupling or spring housing 130 provided with the spring 142. As described above, the spring receptacle 160 may receive the one or more coils 168 of the spring 142 after the fixed end 144 of the spring 142 is inserted into the channel 164 of the coupling 130. The actuation lever 126 may include a distal end 170, a proximal end 174, and a medial portion 172 extending there between. A semi-annular ring 184 may extend from the proximal end 174 or the semi-annular ring 184 may form a portion of the proximal end 174. The semi-annular ring 184 may form a housing or coupling receptacle 182 that may be configured to receive at least a portion of the coupling 130 (e.g., a portion of the annular ring 156).

In one or more embodiments, the semi-annular ring 184 may include a first portion 194 and a second portion 196. The first portion 194 may extend from the proximal end 174 and terminate at an edge 188 and the second portion may extend from the proximal end 174 and terminate at a flange 186 that may extend beyond the edge 188. As will be described in greater detail below, the flange 186 may be configured to lock or fix the housing or coupling 130 with respect to the axial direction (e.g., as represented by the y-axis).

As an example, one or more portions of the actuation lever 126 may be formed by a metal stamping provided with a first leg 176 and a second leg 178 that may be arranged substantially orthogonally to one another. It should be understood that the actuation lever may be formed by another material (e.g., plastic) or another process (e.g., injection molding, additive manufacturing), as required. The first leg 176 may form a bottom portion or base 180 of the coupling receptacle 182 and the semi-annular ring 184 may extend from a portion of the base 180 that defines a bottom 190 of the coupling housing 182. The base 180 may define an aperture 192 and an end portion 166 of the transverse member 124 may extend through the aperture 192. The coupling or housing 130 may be slid (e.g., along the directional arrow D1) and the transverse member receptacle 162 (FIG. 3) may receive the end portion 166 of the transverse member 124.

Figure 5B:
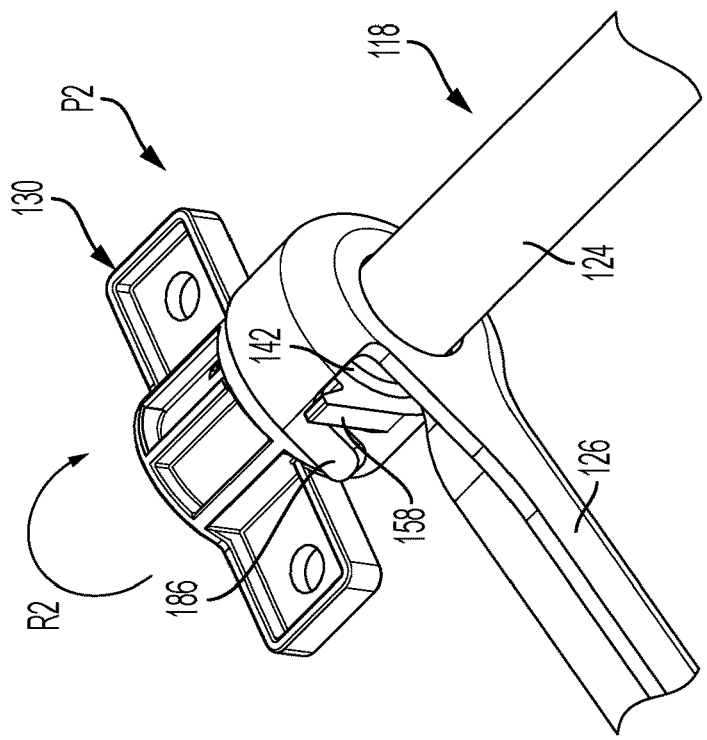
FIG. 5B illustrates a perspective view of the portion of the release assembly illustrated in FIG. 4 in an installed state.
Figure 5A:
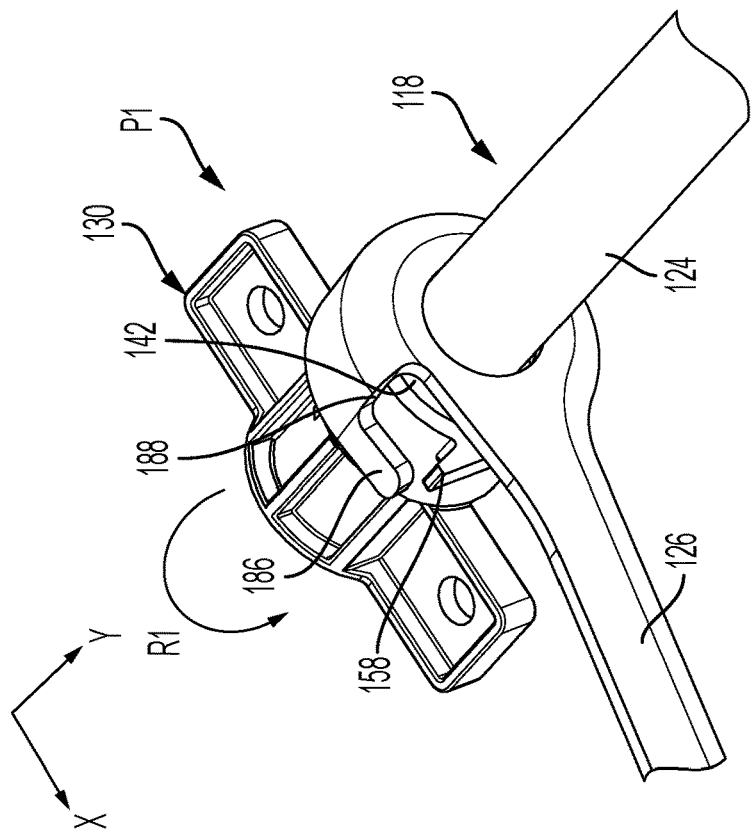
FIG. 5A illustrates a perspective view of the portion of the release assembly illustrated in FIG. 4 in a delivery position.

FIG. 5A illustrates the housing or coupling 130 being assembled to a portion of the actuation assembly 118 and FIG. 5B illustrates the housing or coupling 130 installed to the transverse member 124 and the actuation lever 126. As the housing or coupling 130 (provided with the spring 142) is assembled to the transverse member 124 and the coupling receptacle 182, an operator (e.g., human or machine) may manipulate the coupling 130 to rotate the coupling 130 in a first rotational direction, as represented by directional arrow R1, and move or slide the coupling 130 in the axial direction so that the protrusion 158 moves past the flange 186 in the axial direction (e.g., the represented by y-axis). The position of the housing or coupling 130 relative to the actuation lever 126 may be referred to as the first rotational position P1. As an example, as the coupling 130 is rotated and slid into the first rotational position P1, the free end 146 of the spring 142 may lie against a portion (e.g., the second leg 178) of the actuation lever 126 (FIG. 6A) so that each end of the spring 142 is substantially fixed; the free end 146 lies against the actuation lever 126 and the fixed end 144 is disposed in the channel 164.

Once in position, the operator may release the coupling 130 and torque applied by the spring 142 may rotate the coupling in the second rotational direction R2, as represented by directional arrow R2. As an example, the spring 142 may rotate the coupling 130 so that the coupling is in a second rotational position P2 with respect to the actuation lever so that a surface 198 of the protrusion 158 that faces the edge 188 is within a predetermined distance (e.g. radial angle) of the edge 188. As another example, when the coupling is in the second rotational position P2, the surface 198 may contact or lie along the edge 188.

Figure 6B:
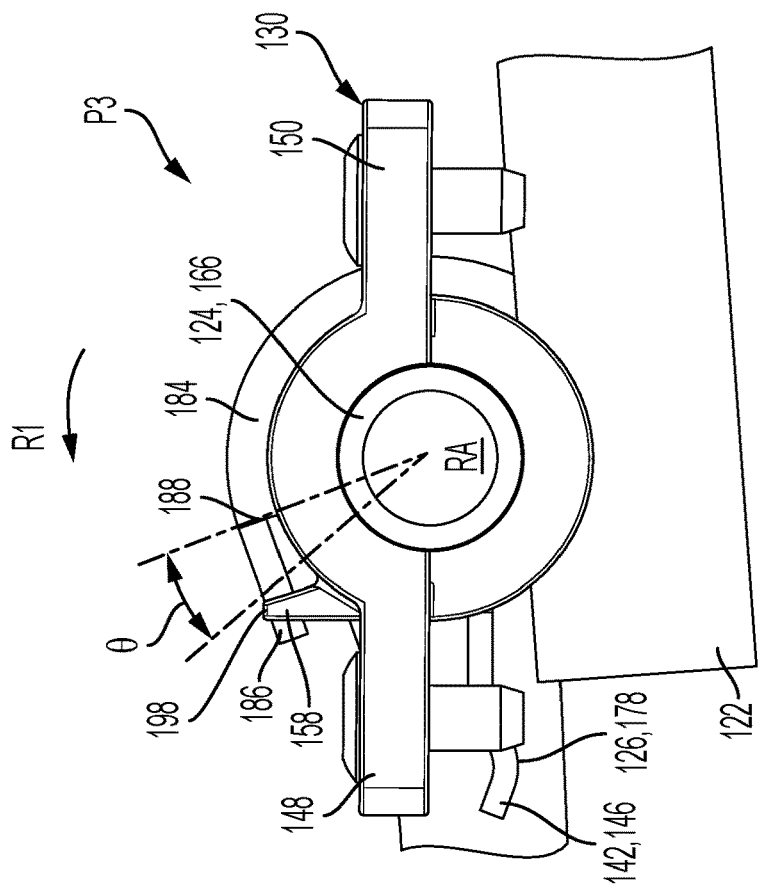
FIG. 6B illustrates a side plan view of the portion of the release assembly shown in FIG. 6A in the installed state.
Figure 6A:
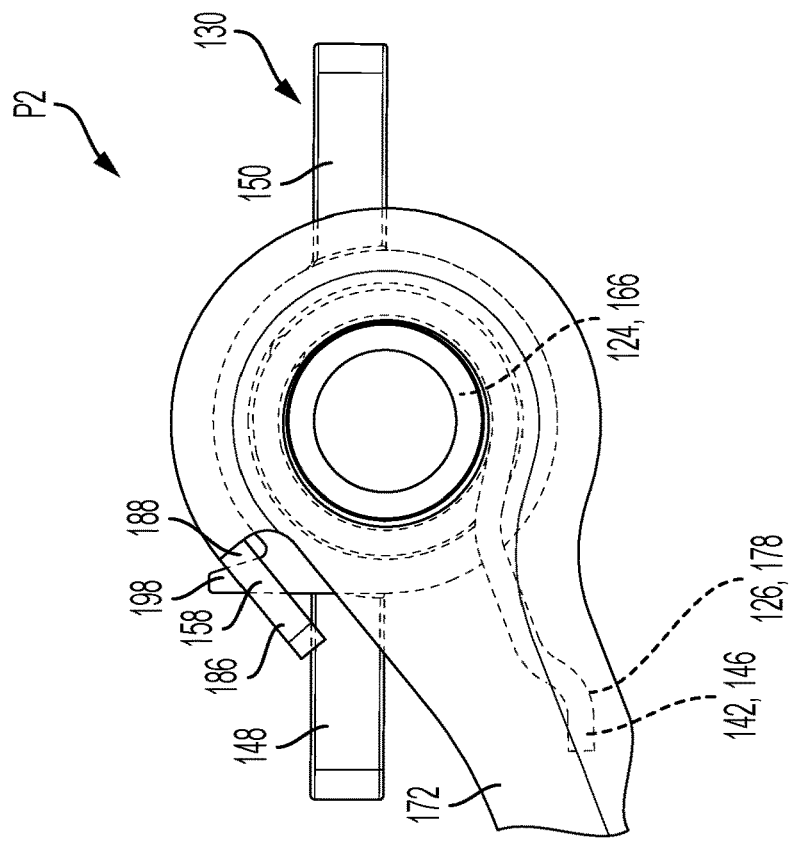
FIG. 6A illustrates a side plan view of the portion of the release assembly illustrated in FIG. 5A in a pre-installed state.
Figure 6C:
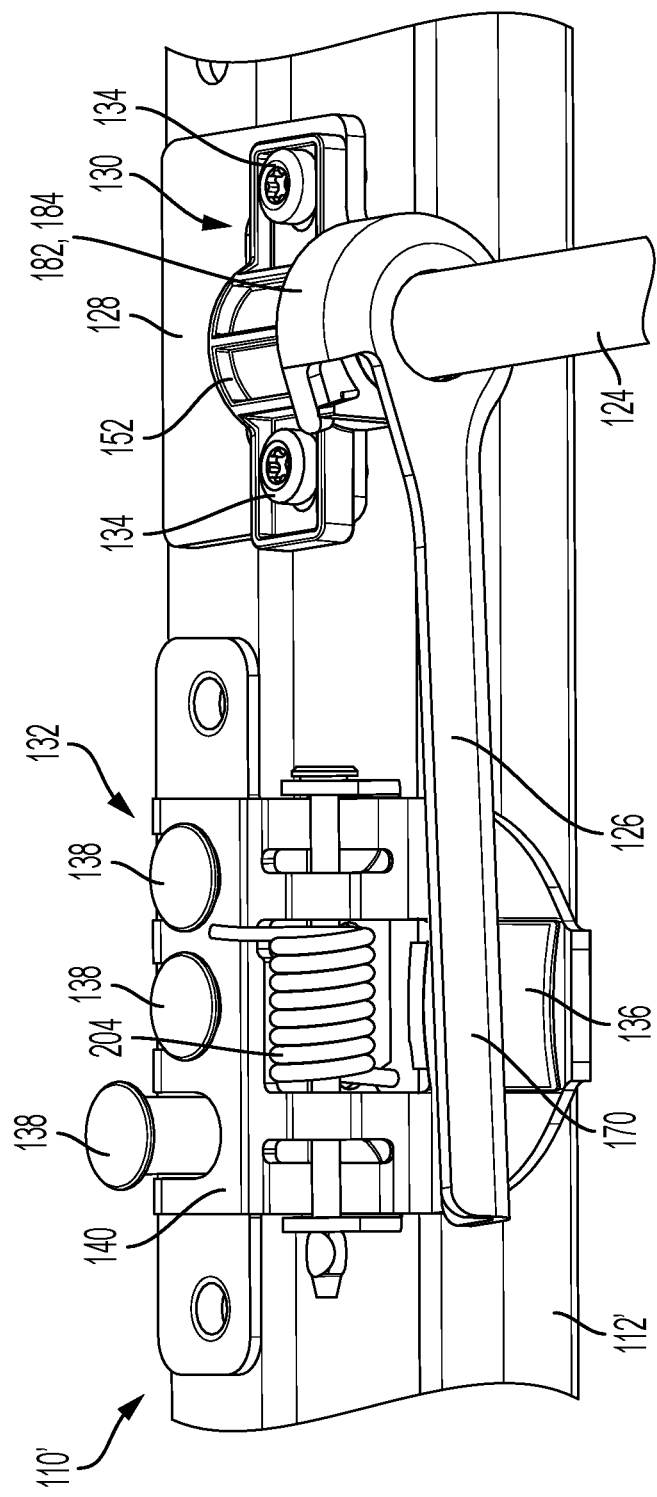
FIG. 6C illustrates a perspective view of the release assembly shown in FIG. 6A in the installed state

FIG. 6A illustrates a side-plan view of the housing or coupling 130, the spring 142, and portions of the actuation assembly 118 in the installed state. For purposes of clarity, the fixed rail 112, translatable rail 114, and the mounting bracket 128 are not illustrated. FIG. 6C illustrates a perspective view of the housing or coupling 130 and portions of the actuation assembly 118 in the installed state. As mentioned above, when the housing or coupling 130 is seated within the receptacle 182, the free end 146 of the spring 142 lies along one or more portions of the actuation lever 126, and the coupling 130 is in the second rotational position P2. And as the housing or coupling 130 is fixed to the rail assembly 110, 110' (e.g., the mounting bracket 128) the housing or coupling 130 may rotate in the first rotational direction R1 (FIG. 6B) to a third rotational position P3, in which the surface 198 is spaced apart from the edge 188 by a predetermined distance (e.g., angular distance θ).

As an example, the predetermined distance may be an angular distance θ measured between two lines each extending from the rotational axis RA of the transverse member 124 to a point on the surface 198 and a point on the edge 188. Alternatively or additionally, the predetermined distance may be a straight line distance between a point on the surface 198 and a point on the edge 188. The straight line distance may range between 2.5 mm and 15 mm.

FIG. 6C illustrates a partial perspective of the right-hand rail assembly 110' and the release assembly 120 assembled (e.g., in the installed state) to the right-hand rail assembly 110'. As mentioned above, the locking device 132 includes the locking lever 136 and a pin lever 140 coupled to the locking lever 136. The locking device 132 may further include a torsion spring 204 that biases the pin lever 140 towards the top surface of the translatable rail 114' so that one or more (e.g., two) pins 138 are in a deployed position and engage the fixed rail 112'. And, in response to a force applied to the handle 122 (FIG. 2), the transverse member 124 rotates relative to the housing or coupling 130 and the actuation lever 126 pivots and moves (e.g., pivots) the locking lever 136 towards the fixed rail 112'.

In response to actuation of the locking lever 136, the pin lever 140 may be actuated to lift the one or more pins 138 to unlock the translatable rail 114' from the fixed rail 112'. As the coupling 130 is fixed to the mounting bracket 128, the coupling 130 may rotate in the first rotational direction (FIG. 6B) to the third rotational position P3 so that the free end 146 of the spring 142 applies a force to the actuation lever 126 so that the actuation lever 126 is biased against the locking lever 136. The force of the spring 142 is insufficient to overcome the force of the pin lever spring 204, so that without an external force being applied to the handle 122 (e.g., by a user), the locking device remains in a locked state, in which the pins 138 lock the translatable rail 114' to the fixed rail 112'.

FIG. 7 illustrates a perspective view of a release assembly 206 as the release assembly 206 is assembled the pair of rail assemblies 110, 110'. The release assembly 206 may include a another housing or coupling 200 provided with a hook 208 that may extend from either the first flange 148 or the second flange 150. The hook 208 may form a gap that is configured to receive a portion of the mounting bracket 128 as the release assembly is fixed or assembled to the rail assemblies 110, 110'. In addition to the hook 208, one or more fasteners 134 may be used to extend through the mounting aperture 154 (FIG. 3) and thread into the one or more apertures 202 defined by the mounting bracket 128.

Figure 8:
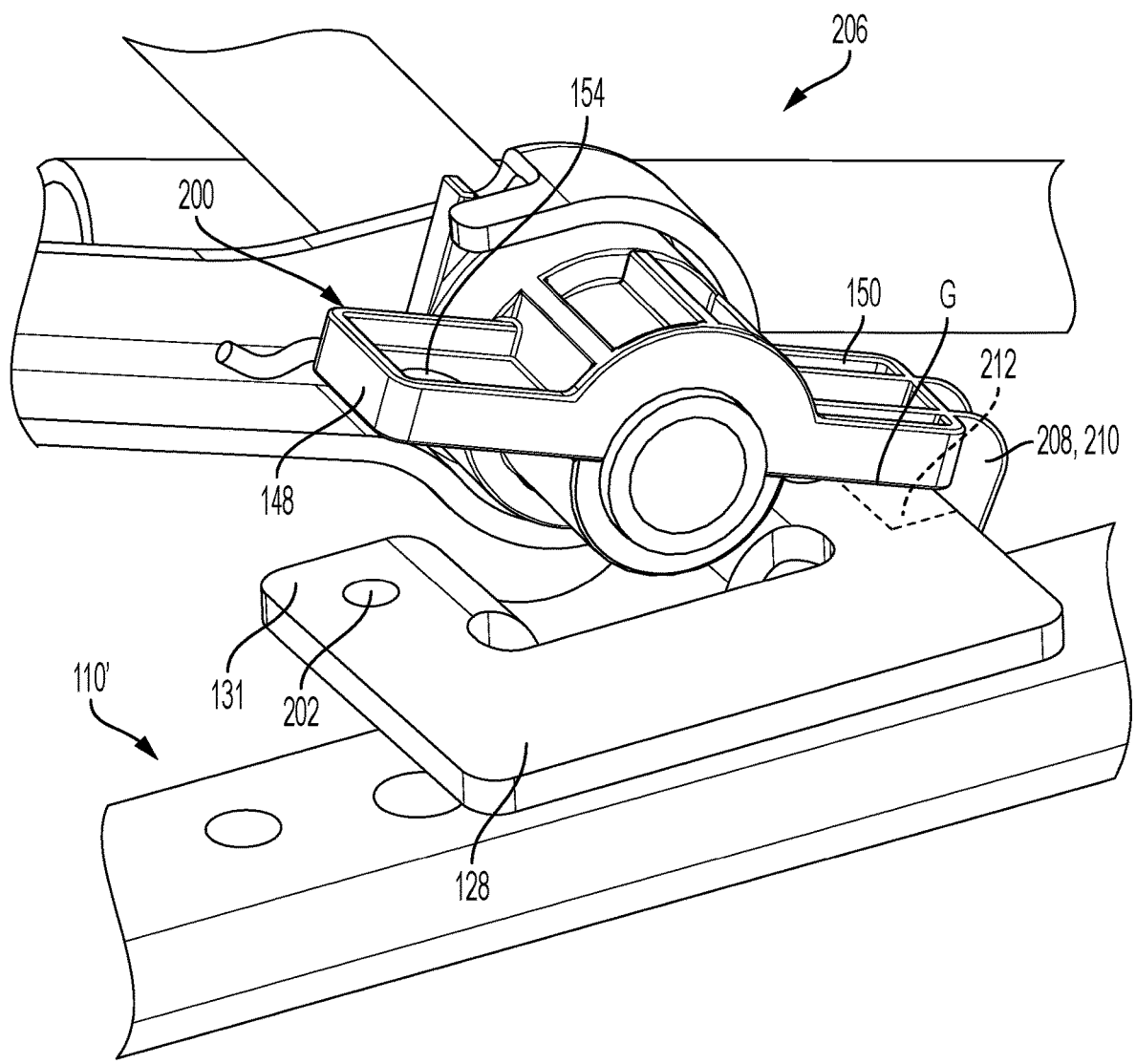
FIG. 8 illustrates a perspective view of the release assembly illustrated in FIG. 7 as the release assembly is installed to a vehicle rail.

FIG. 8 illustrates another perspective view of the release assembly 206 as the release assembly is assembled to the right-hand rail assembly 110'. Here, the hook 208 of the coupling 200 extends from the second flange 150 and not the first flange 148 as illustrated in FIG. 7. In one or more embodiments, the hook 208 may include a first arm 210 and a second arm 212 that may be arranged orthogonal to the first arm 210. As shown, the second arm 212, represented by hidden lines, is disposed below or on the bottom side of the mounting bracket 128. The second arm 212 of the hook 208 may be arranged substantially parallel to the second flange 150 and the second arm 212 and the second flange 150 may form a gap G that is configured to receive a portion (e.g., part of the edge portion 131) of the mounting bracket 128. The hook 208 may also act has a locating feature to assist an operator in assembling the release assembly 206 to the rails 110, 110'. After the hook 208 engages the mounting bracket 128, the first flange 148 may be pressed down to lie along the mounting bracket 128 and one or more fasteners 134 (FIG. 7) may be driven into the mounting aperture 154 and into the aperture defined by the mounting bracket 128.

Figure 9:
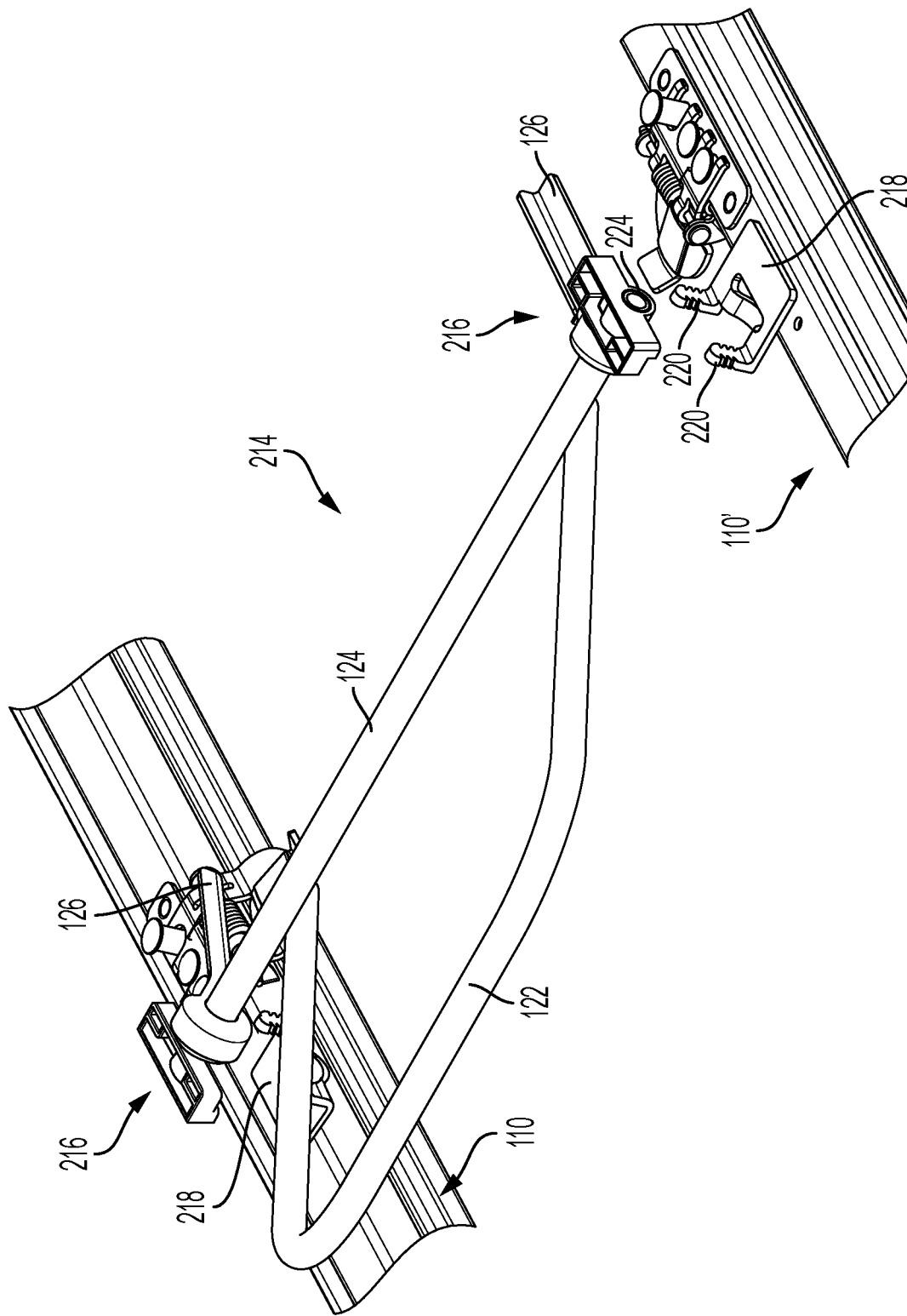
FIG. 9 illustrates an exploded perspective view of another release assembly and a pair of rail assemblies configured for use in a vehicle seat.
Figure 11:
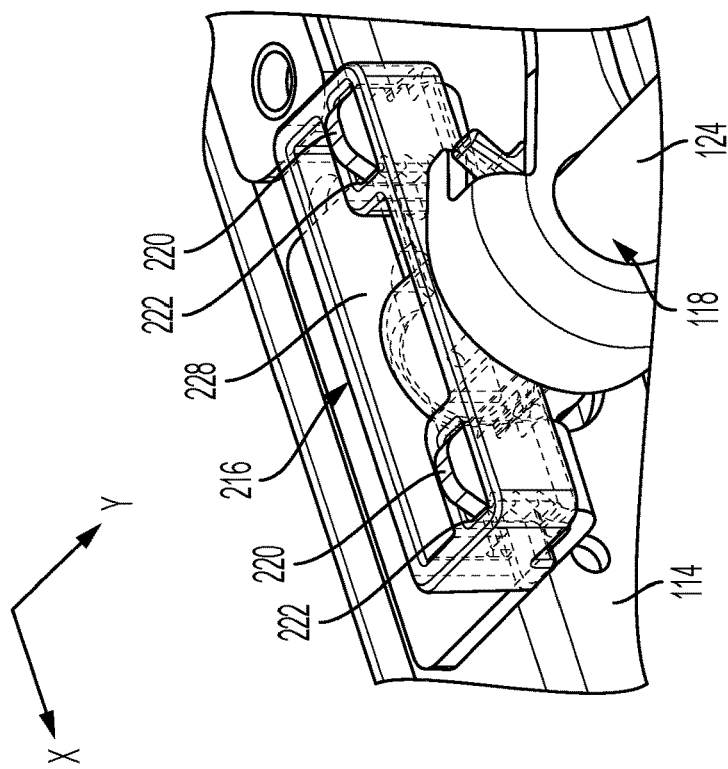
FIG. 11 illustrates a perspective view of the release assembly illustrated in FIG. 9 installed to a rail assembly illustrated in FIG. 9.
Figure 10:
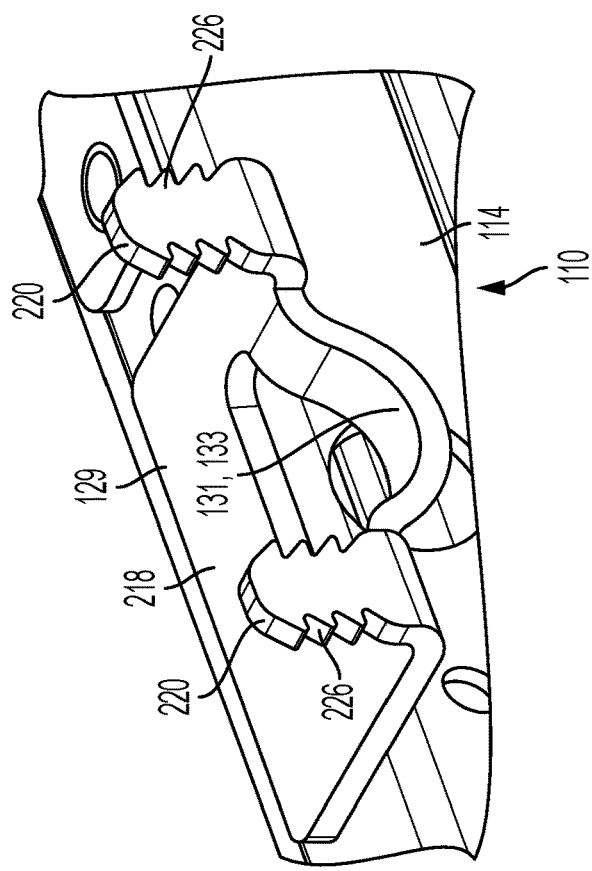
FIG. 10 illustrates a perspective view of one rail assembly of the pair of rail assemblies illustrated in FIG. 9.

FIG. 9 illustrates a perspective view of a release assembly 214 as the release assembly 214 is assembled the pair of rail assemblies 110, 110'. Each of the rail assemblies 110, 110' may include a mounting bracket 218 according to another embodiment and the release assembly 214 includes a housing or coupling 216 according to another embodiment. FIG. 10 illustrates a perspective view of the mounting bracket 218 fixed to the translatable rail and FIG. 11 illustrates a perspective view of the coupling 216 fixed to the mounting bracket 218. As will be described in greater detail below, the configuration illustrated in FIGS. 9-11 may facilitate fixing the release assembly 214 without the use of fasteners.

In one or more embodiments, the housing or coupling 216 may include a main body 228 and a semi-round portion that may be formed by a barrel 224. The main body 228 may define one or more attachment slots 222 that may be disposed on either side (e.g., with respect to the longitudinal direction) of the transverse member 124 of the actuation assembly 118. The mounting bracket 218 may be similar to the mounting bracket 128 described above, in that the mounting bracket 218 includes the main body 129 and the edge portion 131 that defines or forms the recess 133. The recess 133 may be configured to receive a portion of the barrel 224 disposed below the main body 228 of the coupling 216.

The mounting bracket 218 may further include one or more locking protrusions 220 that may extend in a vertical direction from the edge portion 131. The one or more locking protrusions 220 may include one or more retention members such as one or more serrations 226 that may be configured to engage an inner periphery of each of the slots 222 to fix the coupling 216 to the mounting bracket 218. The locking protrusions 220 and the slots 222 may be collectively configured to fix the coupling 216 in the longitudinal direction (e.g., represented by the x-axis) and the axial or cross-car direction (e.g., represented by the y-axis).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 100 vehicle seat
102 cushion portion
104 back rest
106 seat cushion
108 recliner
110 rail assemblies
112 fixed rail
114 translatable rail
116 vehicle floor
118 actuation assembly
120 release assembly
122 handle
124 transverse member
126 actuation lever
128 mounting bracket
129 main body mounting bracket
130 spring housing, coupling
131 edge portion mounting bracket
132 locking device
133 recess of mounting bracket
134 fasteners
136 locking lever
138 pins
140 pin lever
142 spring
144 first end, fixed end of spring 146 second end, free end of spring
148 first flange
150 second flange
152 barrel
154 mounting aperture
156 annular ring
158 protrusion
160 spring receptacle, first receptacle
162 transverse member receptacle, third receptacle
164 channel
166 end portion of transverse member
168 coils
170 distal end actuation lever
172 medial portion actuation lever
174 proximal end actuation lever
176 first leg
178 second leg
180 base
182 coupling receptacle
184 semi-annular ring
186 flange
188 edge
190 bottom of receptacle
192 aperture of base
194 first section
196 second section
198 surface of protrusion
200 coupling
202 aperture mounting bracket
204 pin lever spring
206 release assembly
208 hook
210 first leg
212 second leg
214 release assembly
216 coupling
218 mounting bracket
220 locking protrusion
222 slot
224 barrel
226 serrations
228 main body

What is claimed is:

1. A vehicle seat comprising:
a first rail assembly including a first fixed rail and a first translatable rail, the first fixed rail configured to be fixed to a vehicle floor and the translatable rail configured to translate along the first fixed rail;
a first locking device coupled to the first rail assembly and configured to selectively change between a locked state, in which the first locking device locks the first translatable rail to the first fixed rail, and an unlocked state in which the first locking device unlocks the first translatable rail from the first fixed rail; and
a release assembly provided with,
    a handle including a transverse member and a handle portion extending from the transverse member,
    a first release lever including a distal end portion, a proximal end portion, and a medial portion extending there between, wherein the distal end portion is configured to engage a locking lever of the locking device, wherein the proximal portion includes a first receptacle and defines an aperture, wherein the aperture is configured to receive a portion of the transverse member,
    a first coupling including a flange and a barrel extending from the flange, the barrel defining a second receptacle and a channel, and
    a first spring including a fixed leg and a free leg, wherein the fixed leg is disposed in the channel and the free leg of the spring configured to bias the proximal end portion of the release lever against the locking lever of the locking device.

2. The vehicle seat of claim 1, wherein the first spring includes one or more coils, the one or more coils extending between the fixed leg and the free leg of the first spring and disposed in the second receptacle.

3. The vehicle seat of claim 1, wherein the flange of the first coupling is configured to be coupled to the first translatable rail so that the first coupling moves with the first translatable rail as the first translatable rail translates along the first fixed rail.

4. The vehicle seat of claim 1, further comprising:
a mounting bracket including a main body and an edge portion, the main body fixed to the first translatable rail and the edge portion defining a recess configured to receive a portion of the barrel of the first coupling.

5. The vehicle seat of claim 4, wherein the mounting bracket includes at least one protrusion provided with at least one retention member, wherein the flange of the first coupling defines at least one attachment aperture, wherein the at least one attachment aperture receives the at least one protrusion and the at least one retention member retains the first coupling to the mounting bracket.

6. The vehicle seat of claim 4, wherein the first coupling includes an arm extending from the flange, wherein the arm includes a first portion and a second portion, the first portion extending from the flange and the second portion extending from the first portion and parallel to the flange to form a gap, wherein the gap receives and edge portion of the mounting bracket.

7. The vehicle seat of claim 1, further comprising:
a second rail assembly including a second fixed rail and a second translatable rail, the second fixed rail configured to be fixed to a vehicle floor and the second translatable rail configured to translate along the second fixed rail; and
a second locking device coupled to the second rail assembly and configured to selectively change between a locked state, in which the second locking device locks the second translatable rail to the second fixed rail, and an unlocked state in which the second locking device unlocks the second translatable rail from the second fixed rail;
a first mounting bracket including a main body and an edge region, wherein the main body of the first mounting bracket is fixed to the first translatable rail and the edge region of the first mounting bracket extends from the main body of the first mounting bracket and is disposed between the first rail assembly and the second rail assembly; and
a second mounting bracket including another main body and another edge region, wherein the main body of the second mounting bracket is fixed to the second translatable rail and the edge region of the second mounting bracket extends from the main body of the second mounting bracket and is disposed between the first rail assembly and the second rail assembly,
wherein the flange of the first coupling includes a first hook,
wherein the release assembly is further provided a second coupling provided with a second hook, wherein as the release assembly is assembled to the first rail assembly and the second rail assembly, the first hook and the second hook are each configured to engage and pivot about the edge region of the first mounting bracket and the second mounting bracket, respectively.

8. A release assembly for use in a vehicle seat, the vehicle seat including a pair of rail assemblies, wherein each rail assembly of the pair of rail assemblies includes a fixed rail, a translatable rail, and a locking device, the locking device configured to selectively lock the translatable rail to the fixed rail and unlock the translatable rail from the fixed rail to permit translation of the translatable rail along the fixed rail, the release assembly comprising:
- a coupling including a barrel and a flange extending from the barrel, wherein a portion of the coupling defines a channel and the barrel defines a first receptacle;
- a spring including a first end and a second end, wherein the channel is configured to receive the first end of the spring; and
- an actuation assembly, the actuation assembly including, an actuation lever defining a second receptacle, a transverse member, and
  - a handle, wherein the actuation lever and the handle are each coupled to the transverse member, wherein at least a portion of the barrel is configured to nest within the second receptacle defined by the actuation lever so that the second end of the spring lies against a portion of the actuation lever, and
- wherein in a pre-installed state, in which the coupling is not fixed relative to the translatable rail, the coupling is in a first position with respect to the second receptacle, and wherein in an installed state, in which the flange of the coupling is fixed relative to the translatable rail, the coupling is in a second position with respect to the second receptacle, the second position different than the first.

9. The release assembly of claim 8, wherein the actuation lever includes a proximal end, a distal end, and a semi-annular ring, wherein the distal end is configured to engage and displace a locking lever of the locking device to unlock the translatable rail from the fixed rail, wherein the semi-annular ring forms at least a portion of the second receptacle and extends from the proximal end of the actuation lever and terminates at an edge,
- wherein the barrel includes an annular ring and a protrusion, wherein the annular ring defines the first receptacle and the protrusion extends from an outer periphery of the annular ring,
- wherein when the coupling is the first position, the protrusion is either within a predetermined distance of the edge of the semi-annular ring or contacts the edge of the semi-annular ring, and
- wherein when the coupling is in the second position, the protrusion is spaced apart from the edge of the semi-annular ring by a predetermined minimum distance.

10. The release assembly of claim 9, wherein in the pre-installed state, the spring is configured to rotationally bias the coupling about an axis defined by the transverse member towards the first position.

11. The release assembly of claim 10, wherein in the installed state, the spring is configured to bias the distal of the actuation lever towards the lever of the locking device.

12. The release assembly of claim 8, wherein the actuation lever includes a proximal end, a distal end, and a semi-annular ring,
- wherein the barrel includes an annular ring and a protrusion, wherein the annular ring defines the first receptacle and the protrusion extends from an outer periphery of the annular ring,
- wherein the semi-annular ring defines the second receptacle and includes a first portion and a second portion, wherein the first portion includes a flange and the second portion extends from the proximal end of the actuation lever and terminates at an edge,
- wherein as a force is applied to the handle, the transverse member is configured to rotate about a rotational axis to rotate the actuation lever so that the distal end of the actuation lever engages and displaces a locking lever of the locking device to unlock the translatable rail from the fixed rail, and
- wherein when the coupling is either the first position or the second position, the protrusion of the barrel is disposed between the flange of the semi-annular ring and the proximal portion of the actuation lever, with respect to the rotational axis defined by the transverse member.

13. The release assembly of claim 8, wherein the actuation lever includes a distal end, a proximal end, and a semi-closed cup extending from the proximal end and forming the second receptacle,
- wherein as a force is applied to the handle, the transverse member is configured to rotate about a rotational axis to rotate the actuation lever so that the distal end of the actuation lever engages and displaces a locking lever of the locking device to unlock the translatable rail from the fixed rail,
- wherein the semi-closed cup includes a base and a semi-annular ring extending from the base in a direction parallel to the rotational axis, and wherein the base of semi-closed cup defines an aperture that receives an end portion of the transverse member.

14. A method of assembling a release assembly for use in a vehicle seat, the vehicle seat including a pair of rail assemblies, wherein each rail assembly of the pair of rail assemblies includes a fixed rail, a translatable rail, and a locking device, the locking device configured to selectively lock the translatable rail to the fixed rail and unlock the translatable rail from the fixed rail to permit translation of a translatable rail of one rail assembly of the pair of rail assembly along a fixed rail of the one rail assembly in a longitudinal direction, the method comprising:
- attaching a spring to a coupling, the spring including a first end and a second end, wherein the coupling defines a first receptacle and a channel, wherein the attaching step includes inserting the first end of the spring into the channel defined by the coupling;
- inserting a portion of the coupling into a second receptacle defined by an actuation lever, wherein the actuation lever is fixed to a transverse member, wherein actuation lever is configured to pivot about an axis defined transverse member to engage a locking lever of the locking device to unlock the translatable rail from the fixed rail; and
- rotating the coupling in a first rotational direction, relative to the second receptacle, to a first rotational position so that the second end of the spring engages the actuation lever.

15. The method of claim 14, further comprising:
- rotating the coupling in a second rotational direction to a second rotational position, so that an axial position of coupling is fixed with respect to the axis defined by the transverse member, wherein the second rotational direction is opposite the first rotational direction, and the second rotational position is different than the first rotational position.

16. The method of claim 15, wherein actuation lever includes a proximal end, a distal end, and a semi-annular ring extending from the proximal end and terminating at an edge, wherein the second receptacle is at least partially defined by the semi-annular ring,
wherein the coupling includes an annular ring, a flange and a protrusion, wherein the annular ring forms the first receptacle, wherein the flange extends from the annular ring and the protrusion extends from an outer periphery of the outer ring, and
wherein the rotating the coupling in the second rotational direction step includes rotating the coupling so that the protrusion is spaced apart from the edge of the semi-annular ring by a predetermined distance.

17. The method of claim 15, further comprising:
fixing the coupling relative to the one translatable rail, wherein the one rail assembly includes a mounting bracket fixed to the translatable rail, and the coupling includes an annular ring and a one or more flanges extending from the annular ring, wherein the annular ring forms the first receptacle, and wherein the fixing step includes attaching the one or more flanges to the mounting bracket.

18. The method of claim 17, further comprising:
rotating the coupling in the first rotational direction relative to the second receptacle to a third rotational position, wherein the fixing step and the rotating the coupling to the third rotational position step are accomplished substantially simultaneously.

19. The method of claim 17, wherein the mounting bracket includes one or more locking protrusions, wherein the one or more flanges define one or more apertures, and
wherein the fixing step includes placing the flange of the coupling onto the mounting bracket and the one or more apertures receiving the one or more locking protrusions.

20. The method of claim 14, further comprising:
inserting an end region of the transverse member into a third receptacle, wherein the coupling includes a barrel and an annular ring extending from the barrel, wherein the barrel forms a third receptacle.

* * * * *